United States Patent [19]
Lovaas

[11] Patent Number: 4,909,561
[45] Date of Patent: Mar. 20, 1990

[54] VEHICLE BED COVERS

[75] Inventor: Ann B. Lovaas, Williston, Fla.

[73] Assignee: ABL Unlimited, Inc., Willistion, Fla.

[21] Appl. No.: 333,477

[22] Filed: Apr. 5, 1989

Related U.S. Application Data

[63] Continuation-in-part of Ser. No. 159,184, Feb. 23, 1988, Pat. No. 4,832,395, which is a continuation-in-part of Ser. No. 69,323, Jul. 2, 1987, Pat. No. 4,770,461, which is a continuation-in-part of Ser. No. 36,987, Apr. 10, 1989, Pat. No. 4,741,570, which is a continuation-in-part of Ser. No. 933,483, Nov. 21, 1986, abandoned.

[51] Int. Cl.⁴ ................................................ B60P 7/02
[52] U.S. Cl. ..................................................... 296/100
[58] Field of Search .................. 296/100, 216; 49/234, 49/235

[56] References Cited

U.S. PATENT DOCUMENTS

| | | | |
|---|---|---|---|
| 2,853,340 | 9/1958 | Hershberger | 296/100 |
| 3,165,352 | 1/1965 | Hallock et al. | 296/100 |
| 3,342,523 | 9/1967 | Lutgen | 296/100 |
| 3,640,565 | 2/1972 | Anderson | 296/100 |
| 4,068,886 | 1/1978 | Gostomski | 296/100 |
| 4,784,429 | 11/1988 | Hodges | 296/100 |

Primary Examiner—Robert R. Song
Attorney, Agent, or Firm—Ronald E. Smith; Joesph C. Mason

[57] ABSTRACT

A pickup truck bed is covered by forward and rearward panel members that are slideably mounted with respect to the upstanding vertical sidewalls of the truck bed and telescopically mounted with respect to one another. Each panel has downwardly turned sidewalls. A first panel support member is secured to each sidewall of the forward panel member and a second panel support member is secured to each sidewall of the rearward panel. The first panel support member slides atop the second and both are captured by a track member secured to the vertical sidewalls of the truck bed. A weatherstrip-covered lip member at the leading edge of the first panel and another weatherstrip-covered lip member at the trailing edge of the rear panel serve to protect the truck bed from moisture when the panels are closed. Different embodiments are secured by different locking devices.

44 Claims, 8 Drawing Sheets

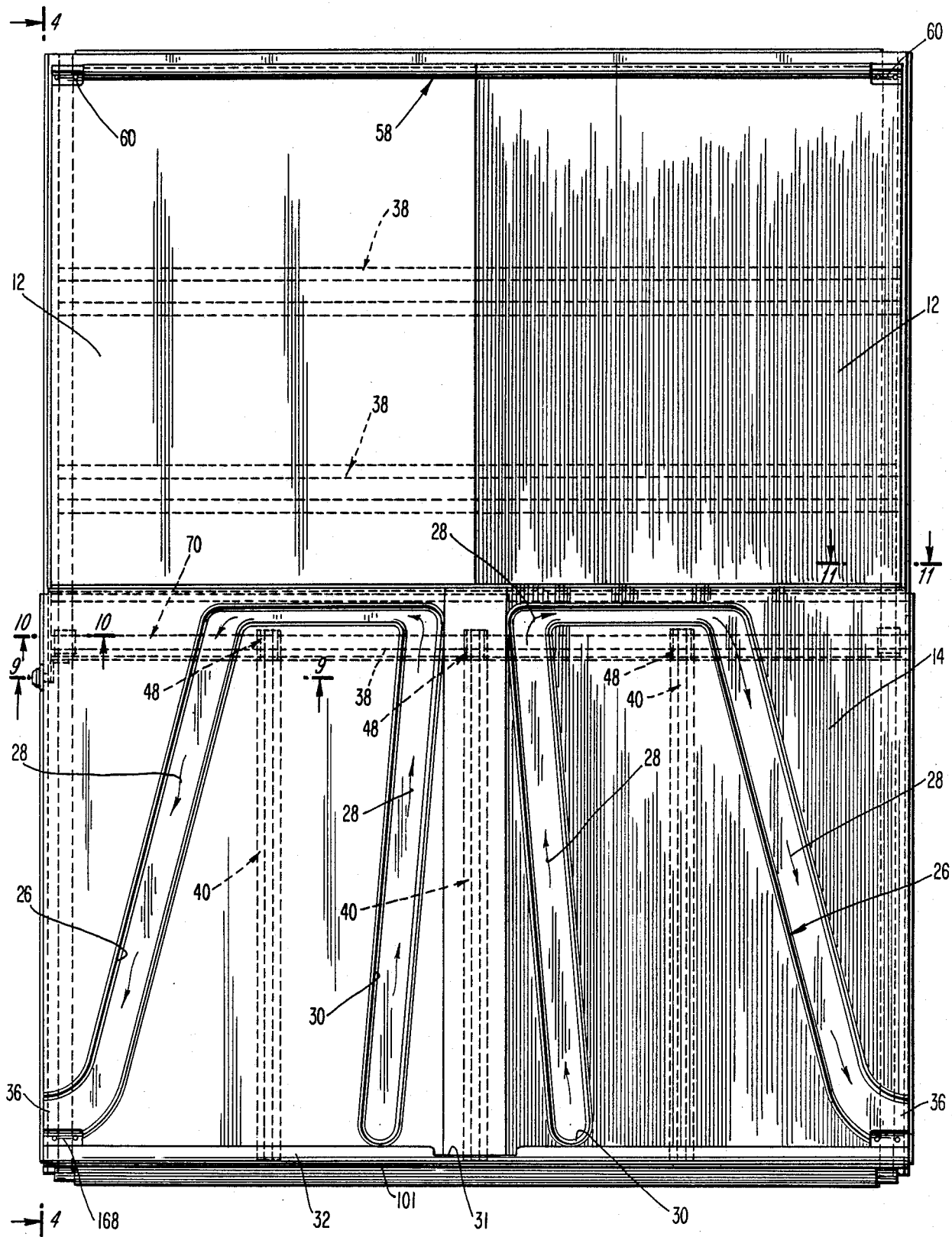

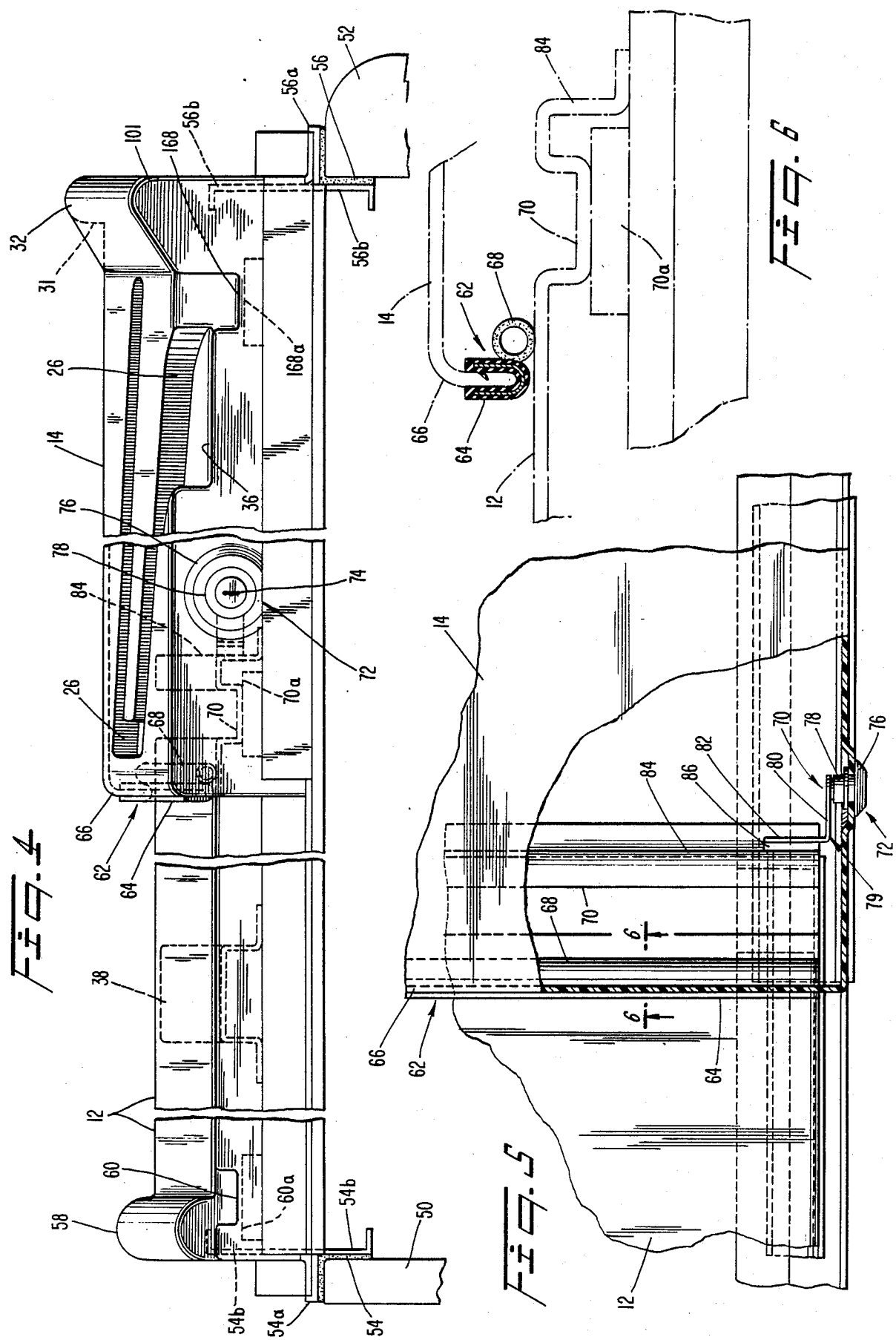

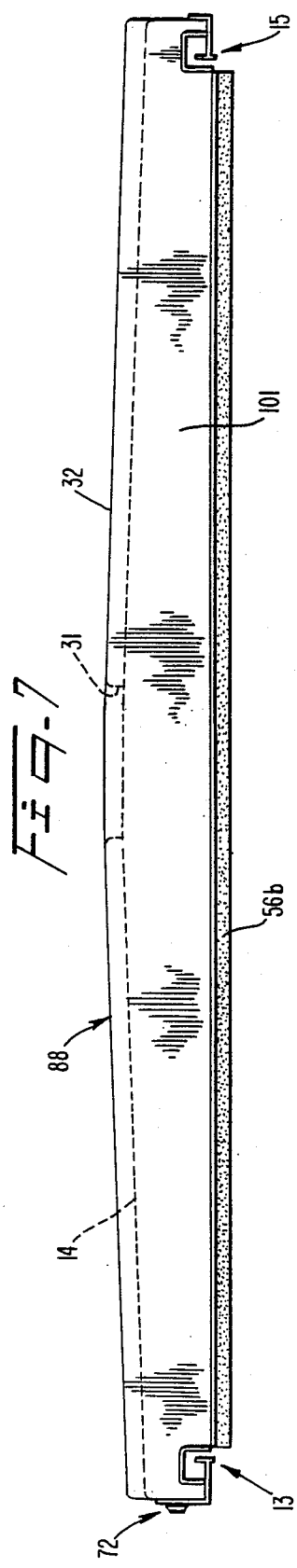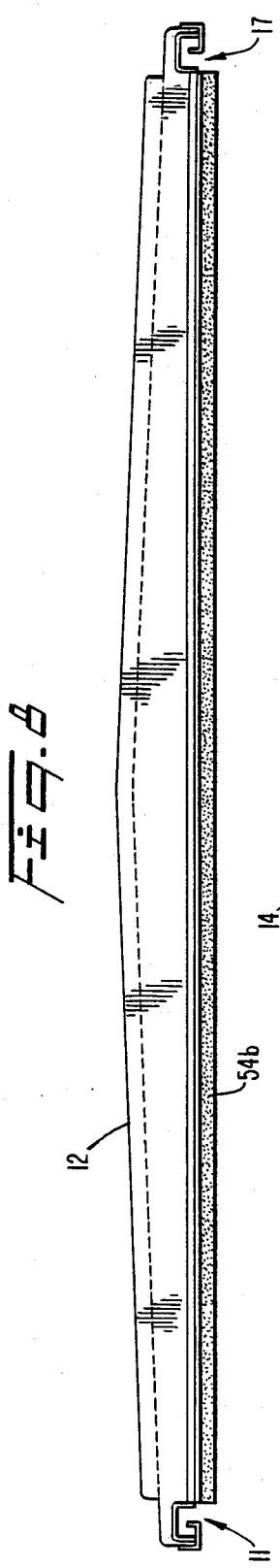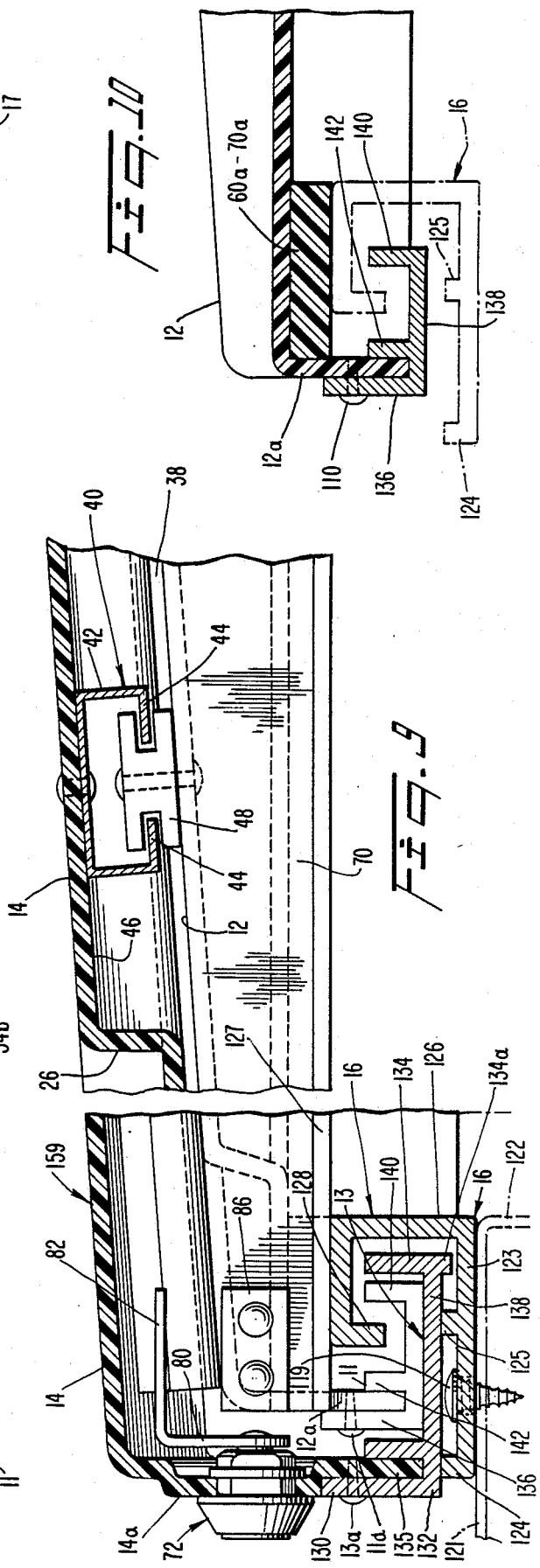

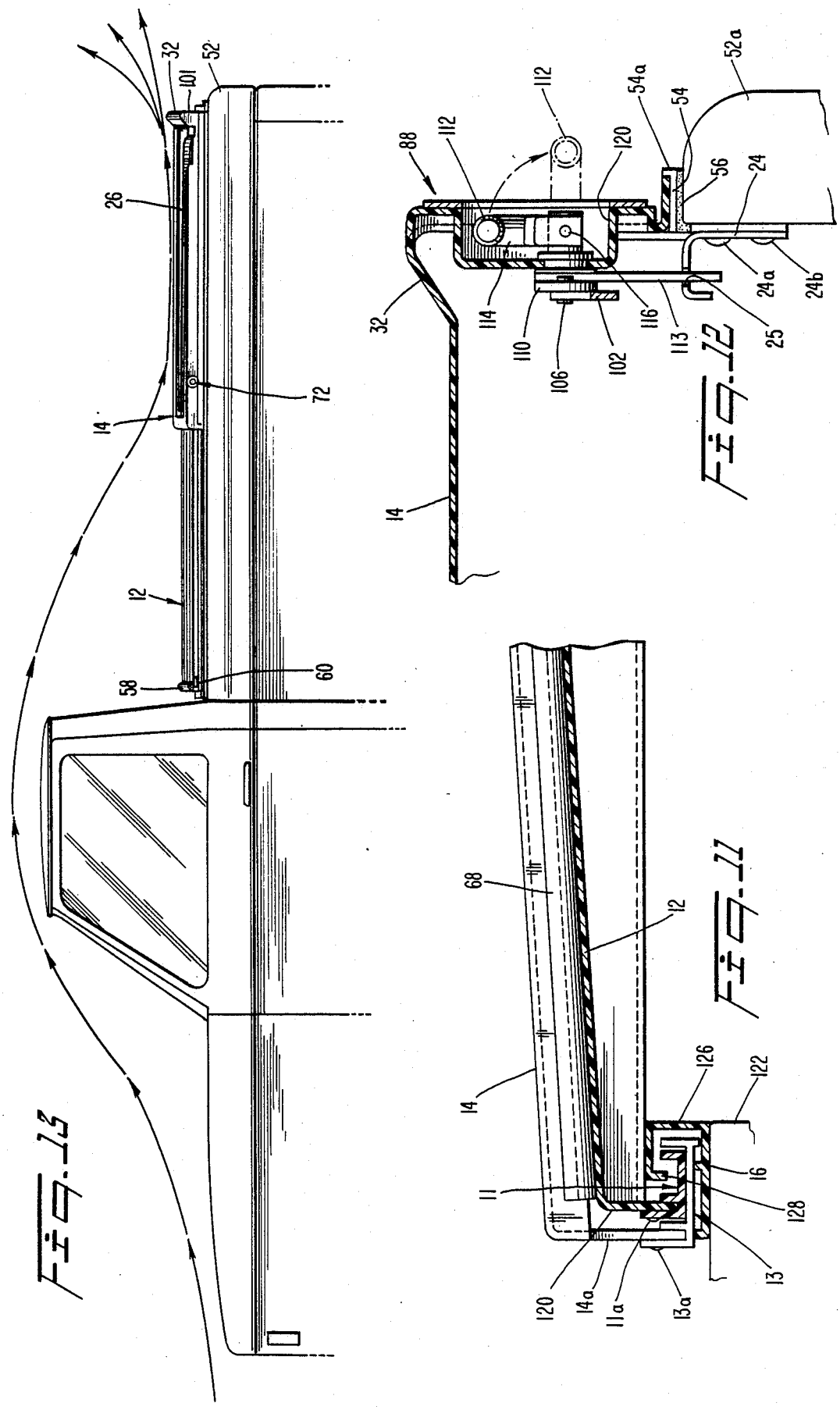

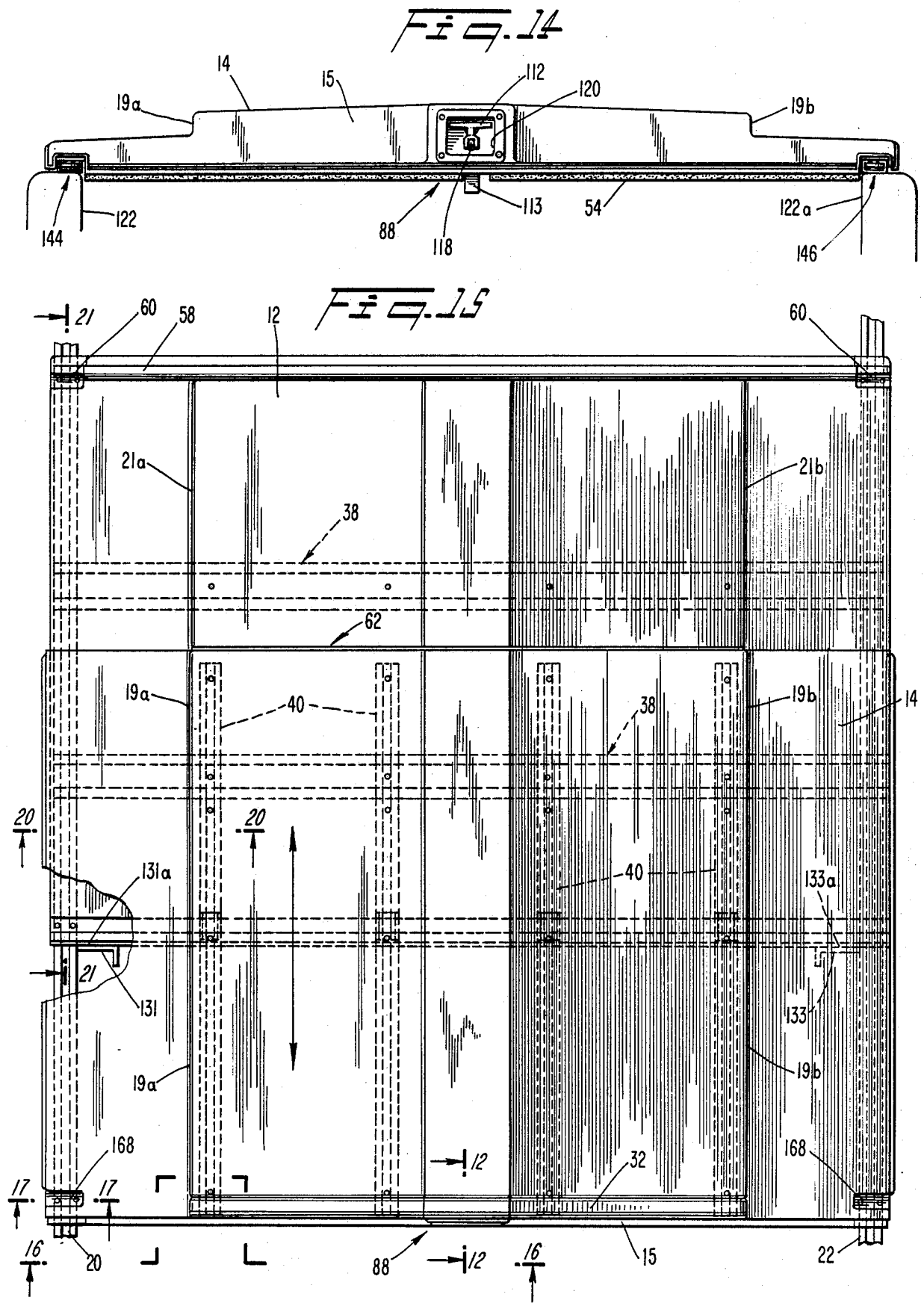

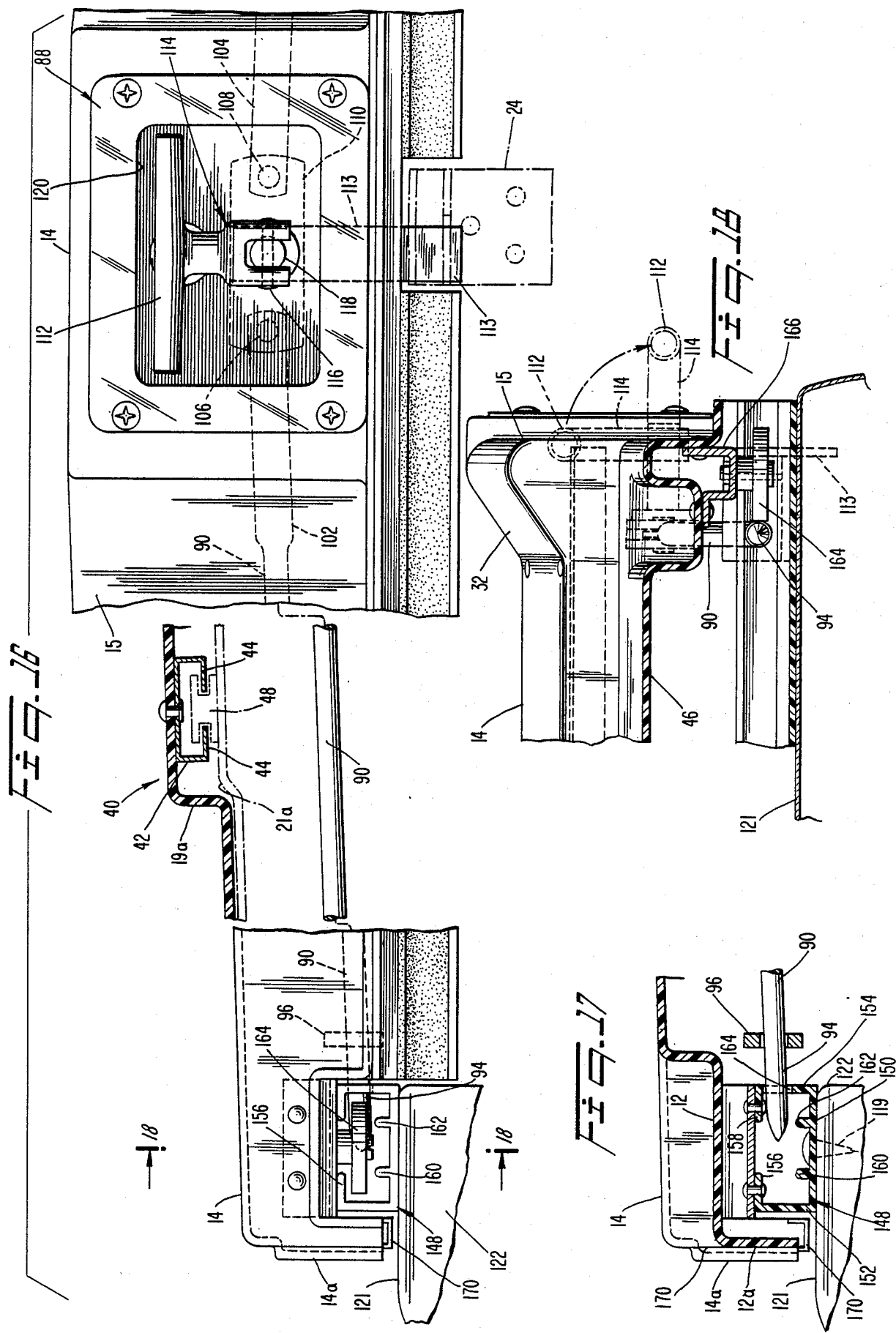

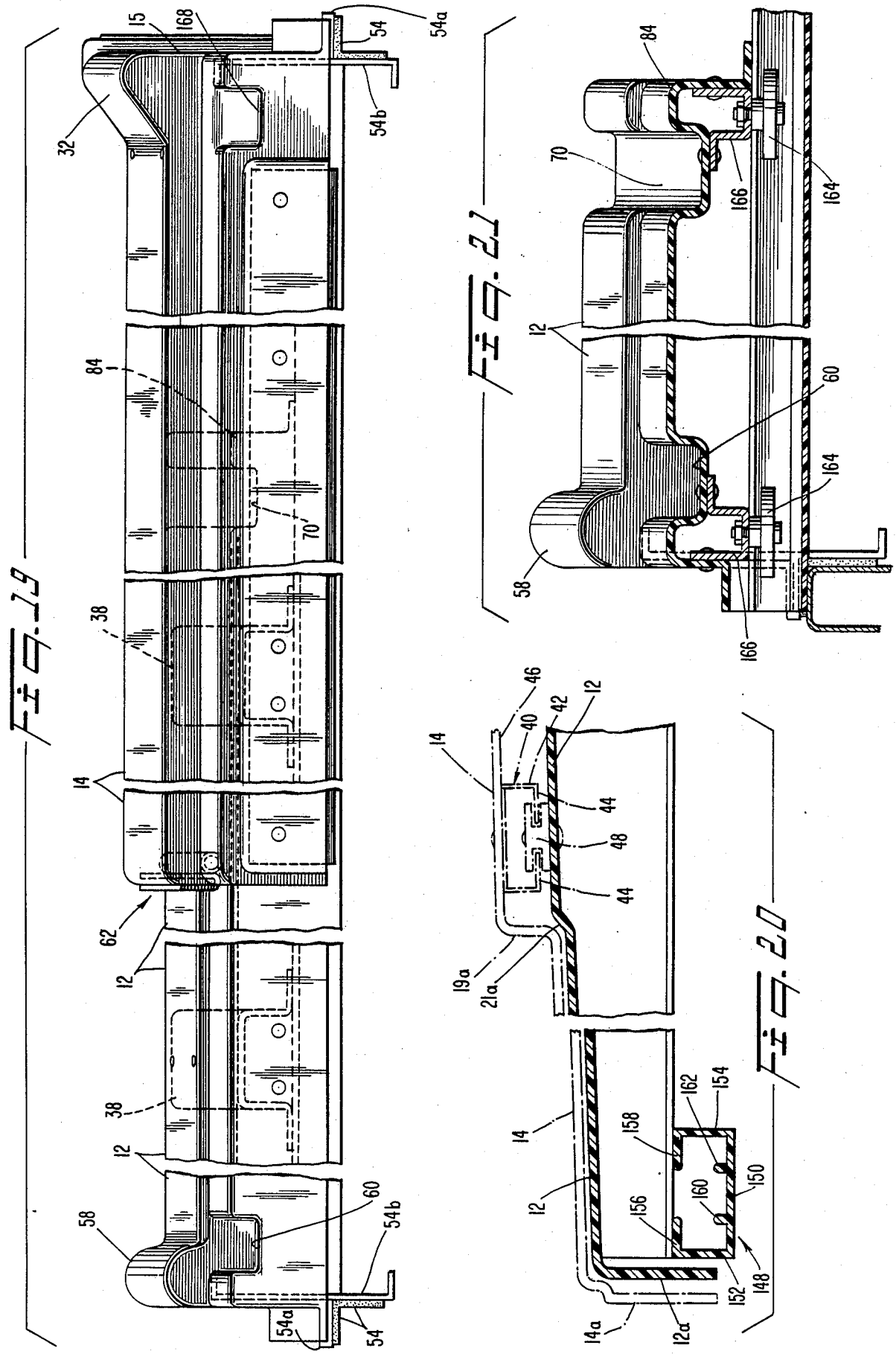

VEHICLE BED COVERS

CROSS REFERENCE TO RELATED APPLICATIONS

This application is a continuation-in-part of application Ser. No. 159,184, filed Feb. 23, 1988 now U.S. Pat. No. 4,832,395, which application is a continuation-in-part of application Ser. No. 069,323, filed July 2, 1987, now U.S. Pat. No. 4,770,461, which application is a continuation-in-part of application Ser. No. 036,987, filed Apr. 10, 1987, now U.S. Pat. No. 4,741,570, which application is a continuation-in-part of application Ser. No. 933,483, filed Nov. 21, 1986, and now abandoned.

TECHNICAL FIELD

This invention relates, generally, to covers for pickup truck beds. More particularly, it relates to a bed cover having two or more telescoping parts, means for locking the cover in its closed position, means for sealing the cover against water leakage, and low friction means for slidably interconnecting the telescoping parts.

BACKGROUND ART

The research and development efforts of the present inventor have resulted in vehicle bed covers of the telescoping type that define the state o the art. A cross reference to her prior disclosures is provided at the beginning of this disclosure.

Although the art of vehicle bed covers in general is well developed, the art has not heretofore produced leakproof, low friction telescoping bed covers that are lockable by elegant means when in their extended (closed) position an which may be opened at either end when unlocked.

DISCLOSURE OF INVENTION

A pickup truck bed cover has a forward panel that is telescopically received within a rearward panel when the bed is at least partially uncovered. The transverse or lateral breadth of the front panel is less than the corresponding breadth of the rear panel. The vehicle bed is completely covered when the panels are extended with respect to one another. The front half of the bed is uncovered by sliding the front panel in a rearward direction, and the back half of the bed is uncovered by sliding the back panel in a forward direction.

A transversely extending forward ridge means is formed at the leading edge of the front panel and a wiper means is provided on the transverse leading edge of the rear panel so that moisture that may have collected on the top of the front panel is swept against the forward ridge and pushed over the opposite sides of the truck bed when the front panel is displaced rearwardly or when the rear panel is displaced forwardly.

In a first embodiment of the invention, the rear panel has channels formed in its top surface to facilitate removal of water therefrom.

A keyed locking means is provided in a first embodiment of the invention; a novel three point locking means maintains the panels in their extended, bed-covering position in a second embodiment of the invention. The invention has numerous additional features as well that relate to sealing of the panels so that water cannot enter the covered area, and to low friction means that permits easy sliding of the panels with respect to one another and which interconnects the panels so that they cannot separate from one another. It is therefore understood that a primary object of the present invention is to provide a vehicle bed cover that efficiently sheds water, that wipes water off the front panel when it is retracted into the rear panel, that may be locked into its extended position, and which is essentially leakproof.

The invention accordingly comprises the features of construction, combination of elements and arrangement of parts that will be exemplified in the descriptions set forth hereinafter and the scope of the invention will be set forth in the claims.

BRIEF DESCRIPTION OF DRAWINGS

For a fuller understanding of the nature and objects of the invention, reference should be made to the following detailed description, taken in connection with the accompanying drawings, in which:

FIG. 1A is a sectional view showing a hand grip formed in the trailing edge of the rear panel of the first embodiment of the invention;

FIG. 3 is a plan view of the FIG. 1 embodiment in its extended configuration;

FIG. 4 is a broken longitudinal sectional view taken along line 4—4 in FIG. 3;

FIG. 5 is a detailed plan view of the locking means that prevents unwanted retraction of the forward panel as well as unwanted forward movement of the rearward panel;

FIG. 6 is a sectional view taken along line 6—6 in FIG. 5, showing the means at the leading edge of the rear panel for wiping moisture into the forward gutter of the front panel attendant relative motion therebetween;

FIG. 7 is an end view of the rear panel member of the first embodiment;

FIG. 8 is an end view of the forward panel member;

FIG. 9 is a broken sectional view taken along line 9—9 in FIG. 3;

FIG. 10 is a sectional view taken along line 10—10 in FIG. 3;

FIG. 11 is a sectional view taken along line 11—11 in FIG. 3;

FIG. 12 is a sectional view taken along line 12—12 in FIG. 15;

FIG. 13 is a partial side elevation view of a pickup truck equipped with the novel bed cover, showing the path of travel of air flow relative to the bed cover when in its extended configuration;

FIG. 14 is an end view of the rear panel of a second embodiment of this invention;

FIG. 15 is a partially broken away plan view of the alternative embodiment of FIG. 2;

FIG. 16 is a broken sectional view taken along line 16—16 in FIG. 15;

FIG. 17 is a sectional view taken along line 17—17 in FIG. 15;

FIG. 18 is a sectional view taken along line 18—18 in FIG. 16;

FIG. 19 is a broken side elevational view of the novel panels in their extended configuration;

FIG. 20 is a sectional view taken along line 20—20 in FIG. 15; an

FIG. 21 is a sectional view taken along line 21—21 in FIG. 15.

Similar reference numerals refer to similar parts throughout the several views of the drawings.

BEST MODES FOR CARRYING OUT THE INVENTION

Figure 1:
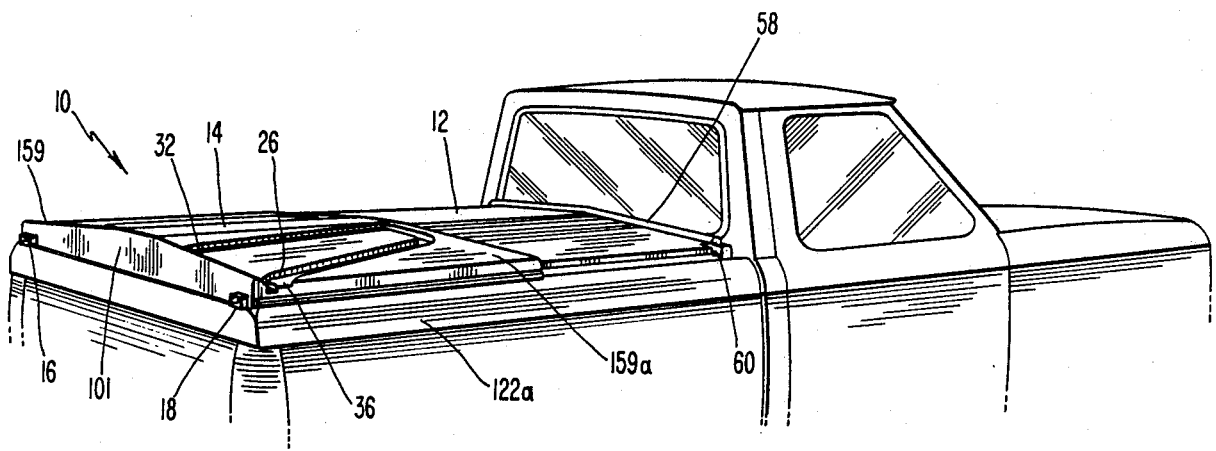
FIG. 1 is a perspective view of a first illustrative embodiment of the present invention, showing the telescoping panels in their bed covering, extended configuration.

Referring now to FIG. 1, it will there be seen that a first embodiment of the novel vehicle bed cover is denoted by the reference numeral 10 as a whole. Cover 10 includes a slidably mounted imperforate forward panel 12 and a slidably mounted, imperforate rearward panel 14. The panels are telescopically formed with respect to one another; accordingly, the rear half of the bed of a pickup truck of the type depicted is exposed to the elements when rear panel 14 is slid forwardly relative to its FIG. 1 position, and the front half of the bed is exposed when front panel 12 is slid rearwardly relative to its FIG. 1 position.

The transverse breadth of forward panel 12 is less than the transverse breadth of rear panel- 14; accordingly, rear panel 14 slidingly receives front panel 12 when the panels are in a retracted configuration. Each panel has a top surface that slopes gently downwardly toward its opposite sides from an elevated central apex, thereby facilitating water runoff. Each panel also has downwardly turned, longitudinally extending sidewalls that are disposed in vertical planes. A longitudinally extending panel support member is secured to the lowermost edge of each downwardly turned sidewall of each panel, as more fully disclosed hereinafter. The panel support members secured to the sidewall of the front panel ride atop the panel support member secured to the sidewall of the rear panel, and both support members are captured by a track means secured atop the upstanding sidewalls that define the transverse extent of the truck's bed, all as more fully set forth herinafter.

Figure 2:
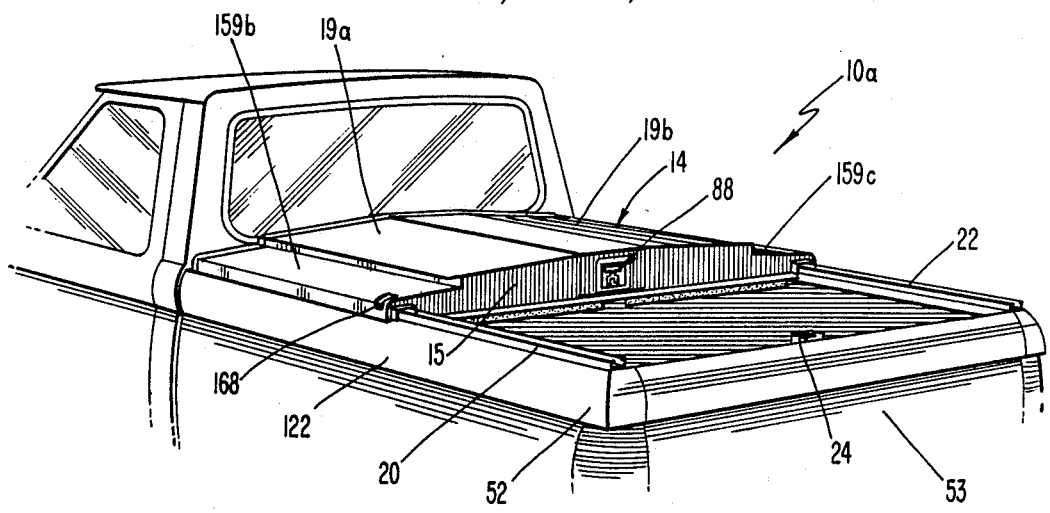
FIG. 2 is a perspective view of a second illustrative embodiment of the present invention, showing the rear panel of the bed cover in its forward position.

In FIG. 2 the reference numeral 10a denotes a slightly different embodiment of the rear panel 14; panel 14 of FIG. 2 has an upper surface that is contoured differently than the upper surface of the panel 14 in FIG. 1; it cannot accommodate the locking means provided as a part of the first embodiment but it does accommodate the locking means of the second embodiment.

FIG. 2 illustrates the configuration of the alternate cover 10a when rear panel 14 has been slid forwardly over front panel 12 to enable loading or removal of items from the rear of the truck bed.

The track members 16, 18 of FIG. 1 upon which the panels slide are different in structure from the track members 20, 22 in FIG. 2; both types of track members are shown in greater detail hereinafter.

A locking assembly 88 for locking rear panel 14 (second embodiment) in its rearward position is depicted generally in FIG. 2; the handle of the locking assembly is shown in its folded or stored configuration. As disclosed in detail hereinafter, manipulation of the handle of locking assembly 88 locks rear panel 14 in three different locations: at side track 20, side track 22, and therebetween at latch 24.

Channels 26 (FIG. 1) are formed in the upper surface of rear panel 14 (first embodiment) to reinforce it and are more fully depicted in FIG. 3; directional arrows 28 depict the directional flow of water when the vehicle is traveling during a rainfall. Each channel 26, of which there are at least two as shown in FIG. 3, has a first or inward generally longitudinally extending part 30 that terminates adjacent a spoiler means 32 which is adjacent the trailing edge of the rear panel, said spoiler means having a hand grip 31 formed mid-width thereof, and a second or outward generally longitudinally extending part 34 that is in open communication with the lateral edges of the panel as at 36. As perhaps best shown in FIG. 1, water in each channel 26, 26 is directed away from the truck as it exits the channels.

Panel 14 could also be reinforced by raised ridges that would replace channels 26; the raised ridges would be the mirror images of channels 26.

As shown in FIGS. 3, 4, 14 and 19, a pair of transversely aligned, parallel rib members, collectively denoted 38 in FIG. 3, span forward panel 12 to strengthen it structurally; the preferred physical construction of each rib member 38 is best shown in FIG. 4, where the depicted member appears truncated due to the slight downward slope of the opposite halves of panel 12 from its elevated central apex.

FIG. 3 also reveals three parallel longitudinally disposed panel interconnecting members, collectively designated 40. The specific construction of each panel interconnecting member 40 is shown in FIG. 9. A rigid, elongate channel member 42 having inwardly turned flange members 44 is riveted as shown or is otherwise suitably secured to the underside 46 of rear panel member 14. A complementally formed base member 48 is similarly riveted or otherwise secured to the top surface of panel 12 toward the rear thereof as perhaps best understood in connection with FIG. 3. Base member 48 is kerfed at its opposite sides as depicted and flanges 44, 44 are slidable with respect thereto. Thus, front panel 12 is somewhat suspended from rear panel 14 when retracted thereinto.

Several more features of the invention are shown in FIG. 4 as well. The front wall of a pickup truck bed is denoted 50 in FIG. 4, and the trailing end of a sidewall thereof is denoted 52. A transversely extending piece of weatherstripping 54 having integral horizontal and vertical parts bars water entry into the truck bed when forward panel 12 is forwardly extended as shown in FIG. 4, and a similar piece of weatherstripping 56 seals the juncture between rear panel 14 and tailgate 53. Each piece of weatherstripping is secured to a transversely extending brace member. More particularly, weatherstripping 54 is secured to the bottom surface of horizontally disposed wall 54a of the forward brace member and thus overlies the top surface of truck forward wall 50 as shown when panel 12 is in its forwardmost position. Similarly, weatherstripping 54 is also secured to the forward surface of vertically disposed wall 54b of the forward brace member and thus overlies the back surface of truck forward wall 50 when panel 12 is in its forwardmost position. A similar brace member 57, including horizontal wall 56a, is provided at the trailing edge of the rear panel 14 to protect the tailgate area of the truck against leakage when the panels are fully extended. Vertical walls 54b, 56b of the front and rear brace members, respectively, extend upwardly as shown to provide reinforcement means for the forward wall of front panel 12 and the rear wall of rear panel 14, respectively, as shown.

The brace members are an important part of the novel panel locking system. They serve as travel-limiting means or stops when they abuttingly engage forward wall 50 and tailgate 53, respectively, thereby ensuring a tight, waterproof fit when the panels are locked into their closed (fully extended) position.

The provision of the front and rear brace members enables the novel panels 12, 14 to be installed on truck beds of differing lengths. For shorter truck beds, there will be more overlap between the trailing and leading edges of panels 12, 14, respectively, relative to longer truck beds where said overlap will be less. The brace members also prevent the panels from sliding out of their tracks when the tailgate is closed.

Front panel 12 includes forward ridge 58 that directs water over the opposite sides of the truck bed, as mentioned earlier; it also serves as a handle means to facilitate the manipulation of forward panel 12. The respective structures of ridge 58 and recesses 60 are perhaps best understood in connection with FIGS. 1 and 13.

The middle part of FIG. 4 shows a wiper means 62 that wipes moisture from the top surface of forward panel 12 against ridge 58 and into forward recesses 60, 60, and over the opposite sides of the truck bed when panel 12 is displaced relative to rear panel 14. A transversely extending, "U"-shaped mounting means 64 is fixedly secured by a suitable means to the edge of downwardly turned, vertically disposed leading wall 66 of rear panel 14. A transversely extending, resilient tubular-in-configuration wiper member 68 is fixedly secured to the mounting means 64 along its breadth; wiper means 68 rides atop the upper surface of forward panel 12 attendant relative motion between panels 12 and 14 as aforesaid and sweeps moisture against ridge 58 and over the opposite sides of the truck bed.

A transversely extending rear gutter means 70 is formed near the trailing edge of forward panel 12 as shown; any moisture that gets past wiper means 68 will drain into gutter 70 and be constrained to exit the novel structure at the laterally spaced opposite ends of rear gutter 70.

The wiper means 62 and rear gutter 70 are perhaps even more clearly shown in FIG. 6.

One of the novel locking means of this invention is positioned just rearwardly of rear gutter 70, and is denoted 72 as a whole in FIGS. 4 and 5. Lock 72 is employed in the first embodiment of the invention and includes key entry 74, non-rotatable frame 76, rotatable cylinder 78, and a bolt means 79, best shown in FIG. 5, that is fixedly secured to and conjointly rotatable with cylinder 78, said bolt means having a longitudinally extending part 80 and a transversely extending part 82. The transversely extending part 82 of the bolt may bear directly against the downwardly turned, vertically disposed trailing wall 84 of forward panel 12; however, since truck beds vary in length, a shim or pad 86 may be disposed between part 82 of the bolt and the vertical wall 84. Pad 86 could also be provided with multiple notches formed therein. Part 82 of the bolt would be received within an appropriate notch.

As shown in both FIGS. 4 and 5, locking means 72 is carried in a downwardly turned, vertically disposed sidewall of rear panel 14; thus, once the locking means 72 is locked with a key (not shown) into the locked position depicted in FIGS. 4 and 5, it should be clear that forward panel 12 is then barred against rearwardly directed travel and rear panel 14 i barred against forwardly directed travel. Importantly, since lock 72 is carried in panel 14, when bolt part 82 bears against rear wall 84 of forward panel 12, the rear wall 56b of rear brace member 57 of rear panel 14 will bear against tailgate 53.

The structure of a second locking means employed in the second embodiment of the present invention is shown in FIG. 16, and is denoted 88 as a whole. As show in FIG. 16, the locking means 88 is in its locked or extended (closed) configuration. Locking means 88 includes an elongate, downwardly inclined, laterally extending first rigid rod member 90 and a second rigid rod member 92. The distal free end 94 of rod member 90 is slidably received within a suitably apertured bracket member 96 that serves as a guide means for rod 90. Similarly, distal end 98 of rod member 92 is slidably received within and guided by apertured bracket member 100 having the same structure as bracket 96. Brackets 96 and 100 are fixedly secured to the interior surface of the downwardly turned, vertically disposed rear wall 101 of rear panel 14.

The respective proximal ends of rods 90, 92 are denoted 102, 104; each is pivotally secured as at 106, 108 to opposite ends of rotatable plate member 110. Plate 110 is mounted for rotation in a vertical plane through manipulation of handle member 112. A locking plate 113, the function of which will be made clear below, is fixedly secured to plate 110 and is conjointly rotatable therewith.

FIG. 16 also provides an enlarged view of handle 112 and its associated parts. Handle 112 has a clevis means 114 where a pin 116 joins the illustrate forked arms to a rotatably mounted shaft member 118 that carries plate member 110.

Handle 112 and its associated parts are collectively disposed in a recessed area 120 formed in the above-mentioned, downwardly turned vertically disposed rear wall 101 of rear panel 14 as is perhaps best understood in connection with FIGS. 12 and 18. FIG. 16 shows the folded or stored position of handle 112 and its associated parts; importantly, rods 90 and 92 are in their extended, locked positions in FIGS. 16. Locking plate 113 is also in its downwardly extending, locked position as well. Thus, this novel locking mechanism, not yet fully disclosed, is a three-point locking mechanism: rods 90 and 92 lock laterally opposite ends of rear panel 14 against movement in a manner to be described, and locking plate 113 extends into a slot 25 formed in latch means 24 shown in FIGS. 2, 12 and 16, to supplement the two aforesaid locking mechanisms. The locking of panel 14 is accomplished when clevis 114 is substantially horizontally disposed, i.e., when handle 112 is in its unfolded configuration as illustrated in FIG. 7. Handle 112 is rotated ninety degrees in a counterclockwise direction from its FIG. 77 position, and is then pivoted about pin 116 into its FIG. 16 position.

FIG. 15 shows slideably mounted bolt latches 131, 133 that are mounted by suitable means to vertical wall 84 at the trailing edge of forward panel 12. Apertures 131a, 133a are formed in track members 20, 22, respectively, to receive the bolt latches when extended outwardly; when the bolt latches 131, 133 are extended, forward panel 12 cannot be slid rearwardly and forward vertical wall 54b of the front brace member will bear against forward truck bed wall 50 to bar forward movement of said panel 12. The bolt latches 131, 133, together with the three point locking apparatus, provide the preferred locking means for the second embodiment of this invention.

The unique structure of the longitudinally extending panel support means 13, 15 of rear panel 14 is also shown in FIG. 7, and the unique structure of the longitudinally extending panel support means 11, 17 of forward panel 12 is shown in FIG. 8. Panel support means 11 and 13 slidably engage one another, as do panel support means 15 and 17, in a manner that will be described with particularity hereinafter, when front and rear panels 12 and 14 are telescopically engaged.

The specific engagement of parts 11 and 13 is depicted in FIG. 9. Both parts are captured by unique longitudinally extending track member 16 (FIG. 1) that is secured along its extent by a plurality of longitudinally spaced screws 119, only one of which is shown, to the top surface 121 of longitudinally extending upstanding left sidewall 122 of the pickup truck. Track member 16 includes bottom wall 123 that overlies top wall 121, a pair of upstanding, longitudinally extending truncate walls 124, 125 that provide a clearance space for the screw heads, inner upstanding wall 126, outwardly turned horizontal wall 127 and downwardly turned vertical wall 128.

Downwardly extending wall 128 provide a capturing function for the parts generally denoted 11 and 13 as will become clear as this description proceeds. Part 13, called a rear panel support means in the claims appended hereto, is secured to downwardly turned, vertically disposed sidewall 14a of rear panel 14 by a plurality of longitudinally spaced, suitable fastening means 13a, only one of which is shown. More particularly, rivets, adhesive or other suitable fastening means 13a join longitudinally extending vertical wall 130 of part 13 to sidewall 14a as shown. Horizontal base wall 132 is integral to vertical wall 130 and terminates in vertical wall 134. Another vertical wall 135 cooperates with wall 130 to maintain sidewall 14a in sandwiched relation therebetween. More specifically, the lowermost edge of sidewall 14a is sandwiched between vertical walls 130 and 135. The upper end of vertical wall 134 is captured as shown by the above-mentioned downwardly extending wall 128 of track member 16, and the lower end thereof is captured by track member truncate wall 125.

Thus, as rear panel 14 is moved forwardly or rearwardly, horizontal wall 132 of part 13 rides atop track member truncate walls 124 and 125. Since there are only two longitudinally extending points of contact between part 13 and track 16, and since low friction materials are used in the construction of said parts, there is very little resistance to sliding motion between such parts.

Part 11, called a front panel support means in the claims appended hereto, is similarly secured to sidewall 12a of front panel member 12. A plurality of longitudinally spaced rivet members 11a, only one of which is shown, secures vertical wall 136 to panel sidewall 12a as shown. Transversely extending horizontal wall 138 is integral to wall 136 and terminates in vertical wall 140. Vertical wall 140 is captured by downwardly extending wall 128 of track member 16. Another vertical wall 142 cooperates with vertical wall 136 to maintain the lowermost edge of panel sidewall 12a in sandwiched relation therebetween.

Thus, when panels 12 and 14 are displaced with respect to one another, horizontal wall 138 of part 11 rides atop horizontal wall 132 of part 13. There is little friction therebetween because panel 12 is suspended by panel 14 as depicted in FIG. 9, and as earlier mentioned, i.e., the inwardly directed flange members 44 support most of the weight of panels 12 so that wall 138 of panel 12 bears lightly against wall 132 of panel 14.

Pad members 60a, 70a and 168a, shown in FIGS. 4, 6 and 10, provide additional low friction sliding support. The pads are secured by adhesive, rivets, or other suitable fastening means to the underside of both forward panel recesses 60, 60, forward panel gutter 70, and both rear panel recesses 168, 168. The pad members slide atop horizontal wall 127 of track members 16, 18, as perhaps best understood in connection with FIG. 10, and are formed of nylon, Teflon (TM) or other suitable durable, low friction material.

The parts associated with forward panel 12 are depicted alone in FIG. 10 to further clarify the inventive structure.

The structure just described is also depicted in FIG. 11; the view is taken as indicated in FIG. 3 to remove the locking means 72 and to otherwise simplify the drawing.

FIG. 12, mentioned earlier in connection with the description of the recessed locking handle 112 and its associated parts, shows latch means 24 in increased detail. It is secured by suitable fasteners 24a, 24b to tailgate 53. A transversely extending open ended slot 25 receives locking plate 113 when handle 112 is rotated counterclockwise from its FIG. 7 position to its FIG. 12 position. As is clear from FIG. 12, locking plate 113 and hence rear panel 14 to which it is affixed can move neither forwardly nor rearwardly when its lower end is captured by slot 25.

Air flow over the cab of a pickup truck is depicted in FIG. 13 by single headed directional arrows. Wind tests have established that air molecules passing over the cab do not impinge upon forward panel 12. Instead, the molecules impact upon the top surface of rear panel 14 about eight inches rearwardly of the leading edge of rear panel 14. Spoiler 32 directs the air upwardly as indicated at the trailing edge of the rear panel. Interestingly, this causes water flowing in channels 26 formed in the top surface of panel 14 to follow the path of travel depicted by the reference numeral 28 in FIG. 3 as mentioned earlier. The water in the innermost grooves actually flows against the wind as shown in FIG. 3. FIG. 13 also further clarifies how the wiper means 62 at the leading edge 66 of rear panel 14 sweeps moisture against forward ridge 58 and over the sides of the bed.

A comparison of FIGS. 1 and 2 will reveal that, with the exception of channels 26, rear panel 14 is raised throughout its breadth in the first embodiment (FIG. 1); the raised hips are denoted 159, 159a. In FIG. 2, by contrast, hips 159b, 159c are not raised. Thus, in the second embodiment, no space is provided to accommodate part 82 of bolt 72 as is perhaps best understood in connection with FIG. 9 which shows how the raised hip 159 of the first embodiment accommodates part 82 when lock 72 is unlocked, i.e., when part 82 is rotated upwardly as shown so as not to bar rearward travel of trailing vertical wall 89 of forward panel 12. The raised hips 159, 159a also accommodate channel members 40 and the kerfed base members 48 as shown in FIG. 9. Panel 14 of the second embodiment has raised hips 19a, 19b as indicated in FIGS. 2 and 14, and forward panel 12 of the second embodiment has raised hips 21a, 21b as indicated in FIGS. 15, 16 and 20.

FIG. 14 also shows that an alternative embodiment of this invention is secured to the left and right sidewalls 122, 122a of the truck's bed by a track and panel support assembly that is structurally but not functionally different from the track and panel support assembly disclosed in connection with the first and second embodiments. The assemblies are denoted 144 and 146 as a whole.

FIG. 15 depicts panels 12 and 14 of the alternative embodiment in plan view, with front panel 12 partially retracted into rear panel 14 as indicated by a comparison of FIGS. 3 (first embodiment, fully extended) and FIGS. 15 (second embodiment, partially retracted). Forward panel 12 has short inclined drop offs 21a, 21b similar to drop offs 19a, 19b formed in panel 14, as perhaps best shown in FIG. 20. Transverse ribs 38 of the second embodiment are the same as ribs 38 of the first embodiment. Longitudinally disposed panel interconnecting members 40 are also the same, but in the absence of structure-enhancing channels (or raised ridges), 26, an additional interconnecting means 40 is provided to reinforce the rear panel of this embodiment.

Alternative track member 148 includes flat bottom wall 150 secured along its longitudinal extent at spaced intervals by fasteners 119 as suggested in FIG. 17, upwardly projecting sidewalls 152, 154 integral with the edges of wall 150, inwardly-turned flanges 156, 158, and laterally spaced upstanding truncate walls 160, 162 which also run the entire longitudinal extent of track member 148. Aperture 164 formed in the inner vertical wall 154 receives distal end 94 of rod 90 as shown when handle 112 is in its FIG. 16 position.

Track member 148 captures disc-shaped member 164 as depicted in FIG. 16. As best understood in connection with FIG. 21, each disc member 164 is fixedly secured by suitable fastening means as illustrated to a mounting member 166 secured by fastening means as shown to the undersurface of panel 12. Thus, as panel 12 is displaced along the extent of track member 148, disc 164 serves as a guide means to insure linear travel of panel 12 and as retainer means to insure that panel 12 remains engaged to track 148. It should be understood that panel 12 has forward and rearward disc members 164, as shown in FIG. 21, on both of its laterally opposite sides; only one disc is provided on each side of rear panel 14, however, as depicted in FIG. 18, i.e., at the trailing end of said rear panel 14. As best understood in connection with FIG. 18, when rod 90 is fully extended as shown in FIG. 16, its distal end 94 blocks forward travel of disc 164 and hence of rear panel 14. Distal end 98 of rod 92 similarly blocks travel of the disc 164 on the opposite side of the truck.

Recess 168, shown in FIGS. 1, 2, 3, 13, 18, and 19 is formed on both laterally opposite edges of rear panel 14, although only the left recess is shown in the Figs. It provides a water runoff and also serves as a mounting surface, like each forward recess 60, to which mounting member 166 is mounted.

J hook 170, shown in FIGS. 16 and 17 is another important feature of this invention. It has a longitudinal extent that is coextensive with the longitudinal extent of panel 14. Its function is to link together the front and rear panels 12 and 14 while allowing relative motion therebetween.

This comprehensive, detailed disclosure of the novel embodiments is not restricted to the specific structures shown. Any modification of or embellishments to the structures disclosed that performs the bed-covering function in substantially the same way as the disclosed embodiments is covered by the claims which follow, as a matter of law.

It will thus be seen that the objects set forth above, and those made apparent from the foregoing description, are efficiently attained add since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A vehicle bed cover, comprising:
 a slidably mounted front panel that extends about one-half of the longitudinal extent of the bed;
 a slidably mounted rear panel that extends about one-half of the longitudinal extent of the bed;
 said front and rear panels mounted telescopically with respect to one another;
 and a first locking means, carried by said rear panel, that prevents rearward travel of said front panel and forward travel of said rear panel when said panels are in a fully extended, bed covering configuration.

2. The cover of claim 1, wherein said first locking means includes a keyed, rotatable cylinder means and a locking bar means secured to and rotatable with said cylinder means, said front panel having a substantially vertical wall at its trailing edge and said locking bar means being rotatable by a key means into blocking relation to said vertical wall to prevent rearward travel of said front panel, and said locking bar means being rotatable out of blocking relation to said vertical wall to permit said rearward travel.

3. The cover of claim 2, wherein said rear panel is configured to provide clearance space above said locking bar means to accommodate said locking bar means when said locking bar means is rotated out of said blocking relation to said front panel vertical wall.

4. The cover of claim 1, further comprising:
 a second locking means, carried by said rear panel, that bars forward travel of said rear panel;
 said second locking means including a centrally disposed rotatably mounted handle member, a pair of oppositely extending, transversely disposed locking rod members, means for guiding said locking rod members, means for retracting both of said rod members when said handle member is rotated in a first direction, and means for extending both of said rod members when said handle member is rotated in a second direction opposite to the first direction, said rod members, when extended, barring forward displacement of said rear panel and said rod members, when retracted, permitting forward displacement of said rear panel.

5. The cover of claim 4, wherein said means for retracting and extending said rod members includes a plate member secured to said handle member, said plate member rotating conjointly with said handle member when said handle member is rotated, and said rod members having their respective inner ends pivotally secured to said plate member.

6. The cover of claim 5, wherein said plate member is rectangular in configuration, where said rod members are pivotally mounted to said plate member at opposite ends of said plate member, where said rod members are in their extended, locked position when said plate member has its longitudinal axis of symmetry disposed in a substantially horizontal plane, and where said rod members are in their retracted, unlocked position when said plate member has its longitudinal axis of symmetry disposed in a generally vertical plane.

7. The cover of clam 6, wherein said second locking means further comprises a flat locking bar member secured to and conjointly rotatable with said plate member, said locking bar member disposed orthogonally relative to said plate member longitudinal axis of symmetry, and said locking bar member depending to said plate member when said rod members are in their extended position.

8. The cover of claim 7, further comprising a latch means having an open-ended slot means formed therein, said latch means being fixedly secured to a tailgate means, substantially centrally thereof, and said slot means receiving said locking bar member when said rod members are in their extended position.

9. The cover of claim 8, further comprising a recess means formed in a trailing vertical wall of said rear panel, said handle means and said plate member being positioned within said recess means.

10. The cover of claim 9, wherein said handle means is pivotally mounted and has a folded and an unfolded position, said handle member extending out of said recess means when in its unfolded position and said handle member being fully received within said recess means when in its folded position.

11. The cover of claim 3, further comprising a pair of laterally spaced, slidably mounted, bolt latch members secured to a trailing vertical wall of said front panel, further comprising track members fixedly secured in surmounting relation to upstanding sidewalls that define the lateral extent of said vehicle bed, and wherein said track members are apertured to receive said bolt latch members when said bolt latch members are extended, said bolt latch members preventing sliding movement of said front panel when said bolt latch members are extended.

12. The cover of claim 1, further comprising a pair of longitudinally extending track members that are mounted in laterally spaced relation to one another on opposite sides of the vehicle bed to be covered, in surmounting relation to upstanding sidewalls of the vehicle that define the transverse extent of said bed, further comprising front and rear panel support means secured to the longitudinally extending lateral edges of the front and rear panels, respectively, and wherein said track means are specifically configured to slidingly receive the front and rear panel support means and to capture said front and rear panel support means to maintain them in said track means.

13. The cover of claim 12, wherein the front panel support means includes an elongate bottom wall, a first vertical wall projecting upwardly from a laterally inward end of said bottom wall, said first vertical wall being captured by said track means, and a second and third vertical wall projecting upwardly from a laterally outer edge of said bottom wall, said second and third vertical walls being closely spaced with respect to one another and tightly receiving therebetween a downwardly turned sidewall of said front panel.

14. The cover of claim 13, wherein the rear panel support means includes an elongate bottom wall, a first vertical wall projecting upwardly from a laterally inward end of said bottom wall, said first vertical wall being captured by said track means, and a second and third vertical wall projecting upwardly from a laterally outer edge of said bottom wall, said second and third vertical walls being closely spaced with respect to one another and tightly receiving therebetween a downwardly turned sidewall of said rear panel.

15. The cover of claim 14, wherein the bottom wall of said front panel support means overlies the bottom wall of said rear panel support means and slides thereatop.

16. The cover of claim 15, further comprising low friction pad members secured to undersurfaces of said front and rear panels at preselected locations, said pad members sliding atop said track members.

17. The cover of claim 15, wherein a bottom wall of each of said track members further includes a pair of laterally spaced, truncate upstanding wall members, and wherein the bottom wall member of said rear panel support means surmounts said truncate wall members and slides thereatop when said rear panel is slideably displaced.

18. The cover of claim 13, further comprising a plurality of transversely disposed support beams disposed in underlying relation to said front panel.

19. The cover of claim 14, further comprising strengthening means formed in said rear panel.

20. The cover of claim 19, wherein said strengthening means is provided in the form of recessed channel members formed in said rear panel.

21. The cover of claim 19, wherein said strengthening means is provided in the form of raised inverted channel members formed in said rear panel.

22. The cover of claim 1, further comprising a track member surmounting each upstanding sidewall of a pair of laterally spaced sidewalls that define the transverse extent of a vehicle bed, each of said track members including an elongate bottom wall, a vertical wall projecting upwardly from an inward edge of said bottom wall, a horizontal top wall projecting outwardly with respect to said inward edge, and a truncate vertical wall depending to an outward end of said horizontal top wall.

23. The cover of claim 22, further comprising a rear panel support member fixedly secured to each downwardly turned sidewall of said rear panel, said rear panel support member having a bottom wall disposed in sliding engagement atop said track member, and having a vertical wall at an inward end of said bottom wall, said truncate vertical wall of said track member barring outward travel of said rear panel support member so that said track member captures said rear panel.

24. The cover of claim 23, further comprising a front panel support member fixedly secured to each downwardly turned sidewall of said front panel, said front panel support member having a bottom wall disposed in sliding engagement atop the bottom wall of said rear panel support member and having a vertical wall at an inward end of said bottom wall, said truncate vertical wall of said track member barring outward travel of said front panel support member so that said track member also captures said front panel.

25. The cover of claim 24, further comprising a spoiler means formed at a trailing edge of said rear panel.

26. The cover of claim 25, wherein a hand grip means is formed mid-length of said spoiler means to facilitate manipulation of said rear panel.

27. A cover for the bed of a pickup truck, comprising:
a front panel having a longitudinal extent about equal to half the longitudinal extent of said truck bed;

a rear panel having a longitudinal extent about equal to half the longitudinal extent of said truck bed;

said front and rear panels having a lateral extent greater than the lateral extent of said bed;

said truck having upstanding, longitudinally extending sidewalls that define the transverse extent of said truck bed;

a longitudinally extending track member fixedly secured in surmounting relation to its associated sidewall;

said front panel having a substantially horizontal top surface and downwardly turned, longitudinally extending lateral sidewalls;

said rear panel having a substantially horizontal top surface and downwardly turned, longitudinally extending lateral sidewalls;

a longitudinally extending front panel support member fixedly secured to the downwardly turned lateral sidewalls of said front panel at a lowermost edge of both of said sidewalls;

a longitudinally extending rear panel support member fixedly secured to the downwardly turned lateral sidewalls of said rear panel at a lowermost edge of both of said sidewalls;

said front panel support member disposed in overlying relation to said rear panel support member and said panel support members being relatively movable with respect to one another;

said rear panel support member being disposed in overlying relation to said track member and being slidable along the extent thereof.

28. The cover of claim 27, wherein said track member captures a laterally inward part of said front and rear panels support members.

29. The cover of claim 28, further comprising a transversely extending wiper means secured to a leading edge of said rear panel that wipes moisture from a top surface of said front panel when said panels are moved relative to one another.

30. The cover of claim 29, further comprising a transversely extending forward ridge means formed near the leading edge of said front panel, said wiper means wiping moisture against said forward ridge means so that moisture is pushed over the opposite sides of the truck bed.

31. The cover of claim 30, further comprising a transversely extending rear gutter means formed near the trailing edge of said front panel, said wiper means wiping moisture into said rear gutter means, thereby disposing of additional moisture not captured by said wiper means.

32. The cover of claim 31, further comprising a first transversely extending lip means disposed at the leading edge of said front panel and said first lip means having a horizontally extending and a vertically extending part, said parts disposed in overlying and abutting relation, respectively, to a horizontal wall and vertical rear wall of a forward upstanding wall that defines the forward extent of said truck bed, when said front panel is in its forwardmost position, and further comprising a weatherstripping means disposed intermediate said first lip means and said forward upstanding wall, said first lip means barring movement of the front panel beyond said forward upstanding wall.

33. The cover of claim 32, further comprising a second transversely extending lip means disposed at the trailing edge of said rear panel and said second lip means having a horizontally extending and a vertically extending part, said parts disposed in overlying and abutting relation, respectively, to a horizontal top wall and vertical forward wall of a rearward upstanding wall that defines the rearward extent of said truck bed, when said rear panel is in its rearwardmost position, and further comprising a weatherstripping means disposed intermediate said second lip means and said rearward upstanding wall, said second lip means barring movement of the rear panel beyond said rearward upstanding wall.

34. A cover for pickup truck beds that have upstanding longitudinally extending sidewalls, a transversely extending forward wall, and a transversely extending tailgate, comprising:

An elongate track member fixedly secured atop each of said sidewalls;

a front panel member having a longitudinal extent greater than half the longitudinal extent of said truck bed;

a front panel support means fixedly secured to downwardly turned, opposite sidewalls of said front panel member;

both of said front panel support means slideably mounted to and captured by said track members;

a rear panel member having a longitudinal extent greater than half the longitudinal extent of said truck bed;

a rear panel support means fixedly secured to downwardly turned, opposite sidewalls of said rear panel member;

both of said rear panel support means slideably mounted to and captured by said track members;

each of said front panel support means being disposed in overlying relation to its associated rear panel support means and being slideably movable with respect thereto;

and a plurality of low-friction pad members fixedly secured to undersides of said first and rear panel members, said pad members slideably riding atop said track members.

35. The cover of claim 34, further comprising a transversely disposed front brace member fixedly secured to a leading edge of said forward panel member, said front brace member having a vertical wall and a horizontal wall projecting forwardly therefrom, said vertical wall abutting a rearward side of said transversely extending forward wall of said truck bed and a downwardly turned forward wall of said front panel member, and said horizontal wall abutting and overlying a top edge of said truck bed transversely extending forward wall.

36. The cover of claim 35, further comprising weatherstripping means fixedly secured to an underside of said horizontal wall and a forward side of the vertical wall that abuts the transversely extending forward wall of said truck bed.

37. The cover of claim 34, further comprising a transversely disposed rear brace member fixedly secured to a trailing edge of said rear panel member, said rear brace member having a vertical wall and a horizontal wall projecting rearwardly therefrom, said vertical wall abutting a forward side of said tailgate and a downwardly turned rearward wall of said real panel member, and said horizontal wall abutting and overlying a top edge of said tailgate.

38. The cover of claim 37, further compising weatherstripping means fixedly secured to an underside of said horizontal wall and a rearward side of the vertical wall that abuts the tailgate.

39. The cover of claim 35, further compising a locking means carried by said rear panel member that abuts a trailing downwardly turned wall of sad front panel member and that urges said front brace member against the transversely extending forward wall of said truck bed.

40. The cover of claim 37, further comprising a locking means carried by said rear panel member that abuts a trailing downwardly turned wall of said front panel member and that urges said rear brace member against the tailgate of said truck.

41. The cover of claim 35, further comprising a pair of slideably mounted, laterally extending locking bolt members fixedly secured to a downwardly turned trailing wall of said front panel member, a bolt-receiving aperture formed in both of said elongate track members, and said bolt members, when laterally extended, engaging said apertures and barring rearward travel of said front panel member.

42. The cover of claim 35, further comprising a three point locking means carried by said rear panel member, said three point locking means including a pair f laterally extending elongate rod members that engage apertures formed in said track members adjacent a trailing edge thereof and further including a locking plate member that engages a latch mean about mid-length of said tailgate.

43. The cover of claim 34, further comprising a "J"-shaped hook member fixedly secured to and coextensive with opposite downardly turned sidewalls of said rear panel member, said hook member linking together said front and rear panel members while permitting sliding movement therebetween.

44. The cover of claim 34, further comprising at least one longitudinally extending panel interconnecting member fixedly secured to an underside of said rear panel member and at least one kerfed base member fixedly secured to a top surface of said front panel member, said at least one panel interconnecting member engaging said kerfed base member on opposite sides thereof, whereby the front and rear panels are slideably interconnected to one another by the engagement of said panel interconnecting members and said kerfed base member.

* * * * *